US006421672B1

(12) United States Patent
McAllister et al.

(10) Patent No.: US 6,421,672 B1
(45) Date of Patent: Jul. 16, 2002

(54) APPARATUS FOR AND METHOD OF DISAMBIGUATION OF DIRECTORY LISTING SEARCHES UTILIZING MULTIPLE SELECTABLE SECONDARY SEARCH KEYS

(75) Inventors: Alexander I. McAllister, Silver Spring, MD (US); James McKinley, Springfield, VA (US)

(73) Assignee: Verizon Services Corp., Arlington, VA (US)

( * ) Notice: Subject to any disclaimer, the term of this patent is extended or adjusted under 35 U.S.C. 154(b) by 0 days.

(21) Appl. No.: 09/361,243

(22) Filed: Jul. 27, 1999

(51) Int. Cl.[7] .............................................. G06F 17/30

(52) U.S. Cl. ................................ 707/10; 707/4; 707/6; 704/246; 704/251

(58) Field of Search ................................ 704/246, 251, 704/258, 257; 707/1–6, 10, 104

(56) References Cited

U.S. PATENT DOCUMENTS

| | | | |
|---|---|---|---|
| 5,553,119 A | 9/1996 | McAllister et al. | 379/221.09 |
| 5,586,171 A | 12/1996 | McAllister et al. | 340/5.52 |
| 5,638,425 A | 6/1997 | Meador, III et al. | 379/218.01 |
| 5,666,400 A | 9/1997 | McAllister et al. | 379/202.01 |
| 5,771,273 A | 6/1998 | McAllister et al. | 379/189 |
| 5,903,864 A * | 5/1999 | Gadbois et al. | 704/251 |
| 5,940,793 A * | 8/1999 | Attwater | 704/231 |
| 5,991,364 A | 11/1999 | McAllister et al. | 379/229 |
| 6,023,697 A * | 2/2000 | Bates et al. | 707/4 |
| 6,065,016 A * | 5/2000 | Stuntebeck et al. | 707/200 |
| 6,243,684 B1 * | 8/2001 | Stuart et al. | 704/275 |

FOREIGN PATENT DOCUMENTS

WO WO9613030 * 5/1996 ............. 17/30

OTHER PUBLICATIONS

"Directory Assistance in bell Canada: Trial Results," Lennig et al., Proceedings of the Second IEEE Workshop on Interactive Voice Technology for Telecommunications Applications, 1994, Sep. 26–27, 1994, pp. 9–13.*
"A Voice–controlled Automatic Telephone Switchboard and Directory Information System," Kellner et al., Proceedings of the 1996 IEEE Workshop on Interface Voice Technology for Telecommunications Applications, Sep. 30, 1996, pp. 117–120.*

* cited by examiner

Primary Examiner—Hosain T. Alam
(74) Attorney, Agent, or Firm—Leonard C. Suchyta; Loren Swingle

(57) ABSTRACT

A telephone directory search method and system intelligently utilizes secondary information contained in subscriber listings to disambiguate search results and provide telephone number and other data associated with a desired party. Upon identification of more than one listing for a particular requested named party, the system searches through secondary information for each of the parties to identify distinguishing information which is solicited from the calling party. Thus, where there are multiple listings for a particular name, the system attempts to identify distinguishing categories of information such as location, department, terminal type, etc., helpful in refocusing the search and eliminating listings from further consideration. The system considers the size of the candidate list in providing prompts, enumerating secondary data for selection when there are few qualifying entries, while generally soliciting information pertaining to the identified category when there is a wide range of secondary information entries to be considered. To enhance user confidence in system understanding of name information, the system incorporates the name pronunciation used by the calling party in system formulation of prompts and announcements provided back to that caller.

35 Claims, 5 Drawing Sheets

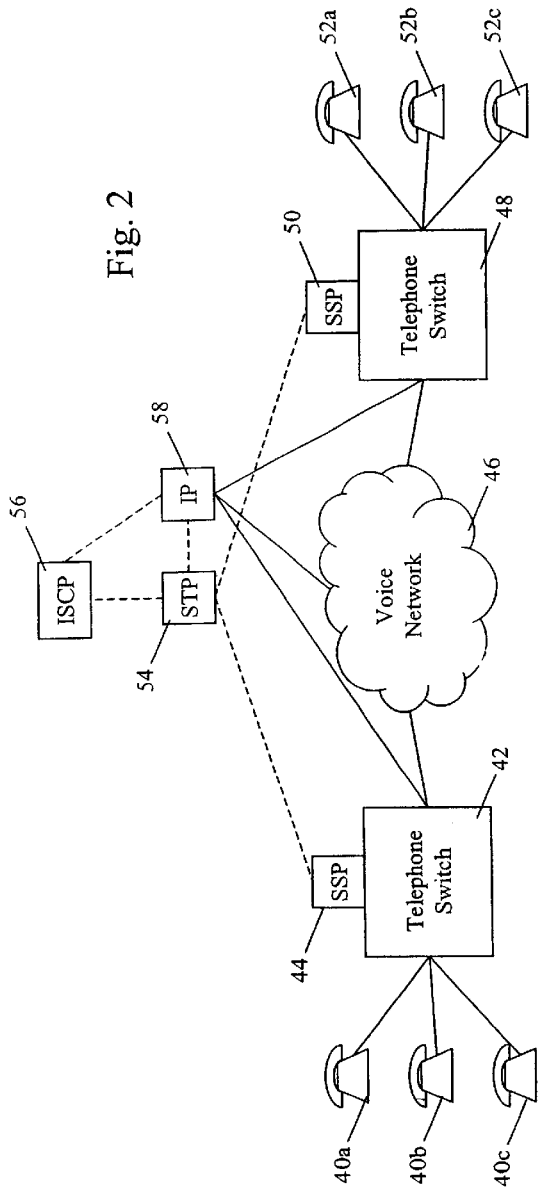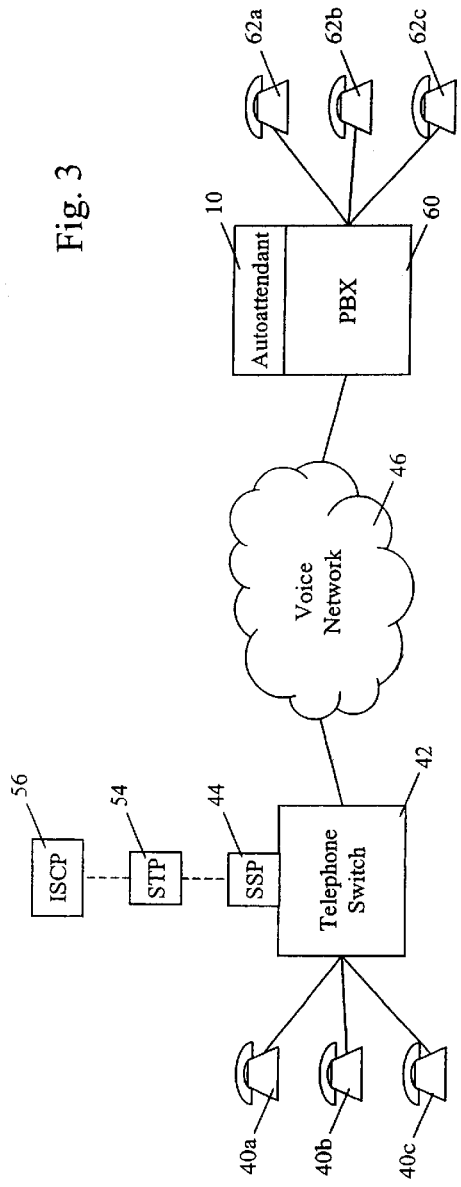

APPARATUS FOR AND METHOD OF DISAMBIGUATION OF DIRECTORY LISTING SEARCHES UTILIZING MULTIPLE SELECTABLE SECONDARY SEARCH KEYS

BACKGROUND OF THE INVENTION

1. Field of the Invention

The invention relates to systems and methods for retrieving information from databases and more particularly to autoattendant systems and methods for routing incoming calls based on a telephone directory.

2. Description of the Related Technology

Forward searchable telephone directory listings and databases are conventionally ordered and keyed to the names of the listed parties, i.e., an alphabetically arranged listing of names with associated telephone numbers. It is not unusual to have several parties with (i) the same name or (ii) names that might be similarly pronounced by someone requesting a telephone listing or otherwise needing to designate a particular person by name. Upon identifying an ambiguous listing condition, i.e., more than one entry satisfying the spoken name search criteria, conventional automatic voice response units (VRUs) may request further information to resolve the conflict and identify the requested party. In particular, such VRUs may inform the caller that the system has more than one person having the particular name requested, play back the names and respective telephone numbers of the parties, and ask the caller to designate which of the parties is being requested. The caller would then be prompted to select from among the identified parties.

For example, a VRU may be used in voice dialing systems to provide speech activated dialing. Using such a system, a calling party speaks the name of the party to be called and the system attempts to recognize the speech as corresponding to a previously stored speech pattern. Similar systems may also be used to provide automated directory assistance functions, including traditional "411" services, which may include provisions for call completion to the directory number identified.

In contrast to traditional auto-dialers used to initiate outgoing calls, automated attendant (autoattendant) systems are used to automatically answer and handle incoming telephone calls. Traditionally, autoattendants play an announcement to the caller and provide for various selections using a VRU. Thus, the caller may be prompted to dial the extension of the party being called and/or given other options, such as leaving a voice message or accessing a directory of names if the extension of the called party is not known. While early directories required the caller to spell the name of the called party using a telephone DTMF keypad, later systems provided for speech recognition of a spoken name. This improvement has been made possible by the commercial availability of reliable speaker-independent voice recognition. Thus, by incorporating a voice responsive directory assistance fiction, the autoattendant answers an incoming call, asks the caller to speak the name of the party or department being called, uses a speaker-independent voice recognition engine to identify and translate a received speech signal into name data, uses the name data to access a telephone directory, and routes or extends the call to the corresponding telephone number.

These systems, however, fail to provide for the resolution of multiple listings under the same name. Instead, when a name search provides an ambiguous result, such conventional systems inflexibly rely on the caller's ability to distinguish between parties based on telephone numbers, information that the caller may and probably does not have. These systems become even more cumbersome as the number of similar names maintained by the directory increase, such as in those parts of the world where similar names are common and where combinations of multiple pronunciations and nicknames further complicate entry resolution. Conventional systems also fail to provide for parties having multiple telephone numbers, e.g., voice, cellular, fax, etc.

Accordingly, a need exists for a directory search engine and method which can resolve ambiguities resulting from records having similar or identical primary search keys. A further need exists for a directory system and method of providing enhanced disambiguation facilities and user interfaces. A still further need exists for an automated telephone directory system which intelligently interacts with a calling party to identify and select a particular listing from among plural listings satisfying an initial search criterion.

A still further need exists for an automated telephone routing system and method which intelligently and dynamically handles directory searches resulting in the identification of multiple listings to one or more subscribers.

SUMMARY OF THE INVENTION

It is an object of the present invention to provide methods and apparatus which will overcome the disadvantages and meet the needs discussed above.

It is one object of the invention to provide for a database retrieval system which includes disambiguation of entries with the same or similar primary keys.

It is another object of the invention to provide for a user-friendly interface to an automated directory search function which intelligently prompts a user for further information to progressively eliminate non-qualifying listings and refocus the search to identify one or more desired listing(s).

It is a further object of the invention to provide a speaker independent voice recognition and voice response unit which automatically formulates a minimal set of prompts to identify a desired telephone listing when (1) the name of the desired party is not unique or (2) the caller does not initially provide or does not know the full name of the desired party.

The present invention addresses the disadvantages in the prior art by providing an intelligent database search engine which, when finding multiple listings satisfying a primary or initial search request, provides a series of prompts soliciting further information relative to the ambiguous results. The prompts are dynamically composed to quickly minimize the group of qualifying candidate listings until only one listing remains or until no further information distinguishing between or among the candidate listings would be helpful or is available.

A database retrieval system according to the invention includes a searchable database in which the primary key, such a name associated with a telephone directory listing, may be duplicated, i.e., is not unique. To resolve or disambiguate the conflict, the user is prompted to supply additional information determined to be helpful in selecting from among candidate records having the same key. For example, if multiple listings are identified for the telephone listing "John Smith", the system will examine secondary data fields to identify information unique among the listings, such as the addresses of the listings. The system will then prompt the caller to identify which of the listings is desired, using the address information to distinguish among and select the desired listing(s).

The present adaptive disambiguation system and method dynamically selects additional listing information most useful in resolving the search ambiguity and caller selection process. Using either a fixed or entry specific prioritization, listings with identical or similar name key information are compared to identify distinguishing secondary information (e.g., employee location department, etc.) that might be given to the caller to complete the selection.

By way of example, the following candidate parties might be identified by a corporate automated attendant system in response to a caller asking to be connected to a "Robert Cook":

| Name | | | | | Telephone |
|------|------|----------|----------------|-----------|--------------|
| Last | First | Nickname | Location | Dept. | Number |
| Cook | Robert | Rob | Arlington, VA | Legal | 703-974-1234 |
| Cooke | Robert | Bob | Philadelphia, PA | Engineering | 215-963-1234 |
| Koch | Robert | Robbie | Silver Spring, MD | Engineering | 301-608-5678 |

As an initial point, conventional VRUs may not include the capability of matching a spoken name with variations in pronunciation possible for names of a directory listing. For example, the listing "Koch" may be pronounced as "Koch", "Cook", "Coke", etc. The present system accommodates these variations and alternative pronunciations used by both (i) the named party and (ii) the caller by providing generalized and/or listing specific alterative pronunciations and nicknames corresponding to particular names and/or listings. While this feature provides enhanced search capabilities, it also tends to exacerbate the disambiguation problem.

Upon identifying the parties listed in the table above as candidates, the system uses a hierarchical search pattern to identify distinguishing information about the parties for presentation to the caller. As previously mentioned, conventional systems typically provide the caller with the names and telephone numbers of all of the candidate entries. Instead, the present system may first look to the Department field of the candidate entries to determine if they are unique. In this example, two of the candidate parties work in engineering, so that this category of information may not be useful to help select the correct party to be called. The system may next look to the location field and, as in the example above, determine that this information is unique among the candidates. The system would then provide the caller with both the name and location of the identified listings and ask the caller to select among the parties, typically by saying or using a keypad to input the number of the selection, e.g., "Say or push '1' to dial Robert Cook in Arlington, Virginia; '2' for the Robert Cook in Philadelphia, Pennsylvania; and '3' for Mr. Cook in Silver Spring, Maryland."

In addition to a static presentation of selection alternatives, the system is adaptable to provide an interactive colloquy with the caller in an effort to resolve the ambiguity. For example, the system may attempt to limit the set of candidates by asking a series of questions such as: "We have [specify number found]["multiple"] listings for employees named 'Robert Cook', do you know if your Mr. Cook is in Engineering or Legal?" The system would then use any new information to select one or more potential candidates and/or to solicit additional information to resolve or minimize the ambiguity.

To reduce the perception that the system has misinterpreted the name of the party, the system may prompt the caller using the name pronunciation used by the caller. Thus, for example, the system may respond to the name "Robert Cook" with "We have multiple listings for 'Robert Cook', including spellings C-O-O-K, C-O-O-K-E, and K-O-C-H. Do you know which spelling is correct?" Alternatively, had the caller requested a listing for a "Robert Koch", the system would repeat the caller's pronunciation in future prompts during the call, although using standard or party specified pronunciations when providing alternative listings. Thus, the system might respond "We have multiple listings for 'Robert Koch', including a 'Robert Koch' in Engineering, a 'Bob Cook' spelled K-O-C-H in sales, and a 'Rob Koch' in Legal. Do you know which department Mr. Koch is in?"

The system may also use a fuzzy logic method in selecting candidates. Criteria may include, for example, the frequency of calls routed to a particular party through the system, party specific nicknames, origin of the caller in comparison to candidate locations, etc. The order of presentation of the candidate names may also be affected by such considerations so that most likely candidates are announced before others.

The system may further consider and eliminate unlikely pronunciations. For example, while the name spelled "K-O-C-H" may be a potential candidate listing for the spoken name "Cook", the converse is unlikely, i.e., a name pronounced "Koch" would not be spelled "C-O-O-K." As another feature of the invention, the system may additionally resolve ambiguities based on spelling, providing the spelling of a name to the caller or asking the caller to spell the name of the party being called, the method chosen possibly being dependent on the number of candidate listings identified.

According to one aspect of the invention, an information retrieval system includes a data base including a plurality of records. Each of the records includes (i) a primary key field storing first identification data, (ii) at least one secondary key field storing secondary data, and (iii) a target information field storing requested data. An input processor receives input identification data. A search engine, responsive to the input identification data, accesses the data base, compares the input identification data with the first identification data and identifies matching records. A processor identifies respective secondary data of the matching records, the secondary data distinguishing one or more of the records from the others. An output device is connected to provide a prompt including the secondary data for soliciting an input designating one or more of the selected ones of the records.

According to a feature of the invention, the database may be an ordered directory of subscriber names and respective telephone numbers. According to another feature, the first identification data includes subscriber name information, the secondary data includes location information, and the requested data includes terminal address information. Secondary data may also include name information such as first, middle, nickname, or special pronunciations.

According to another feature of the invention, the system further includes a speech recognition engine receiving a speech signal for providing the input identification data. An interface may be included for providing the speech signal from a telephone network.

According to another feature, the system output device may include a speech playback means in the form of a speech synthesizer for providing a spoken request soliciting the input selecting the one or more of the matching records. Each of the records may include audio data, the speech synthesizer responsive to the audio data for providing the spoken request. The system may further mimic the input speech of the caller by identifying the phonemes of the spoken name and using that information when repeating the name back to the caller.

According to another feature of the invention, the secondary data includes a plurality of information types and each of the secondary key fields stores plural ones of the information types. The information types may include location, department, terminal equipment, alternative names, occupation and specialization information.

According to another feature of the invention, the system includes a telephone dialer for connecting a call in response to a receipt of the input designating one or more of the selected ones of the records.

According to another feature of the invention, each of the records includes audio data and the information retrieval system further comprises a speech synthesizer responsive to the audio data for providing a speech signal corresponding to a designated one of the selected records. The audio data is formatted as a Windows Wave format (".WAV"), MPEG Audio Layer 3 ("MP3"), or equivalent "playable" file or may include pronunciation rules for generating speech representing information stored as a part of a corresponding one of the records. Pronunciation rules may also be stored in the form of a pronunciation table of ordered name pronunciation data. A speech generator is responsive to the name pronunciation data for generating a speech signal.

According to another feature of the invention, the system processor is operative in an interactive conversational mode for generating a series of prompts eliciting called party identification information from a caller based on distinguishing characteristics of an initially identified subset of potential called parties.

According to another aspect of the invention, a telephone directory system includes a directory of subscriber records, each of the subscriber records including (i) a primary key field storing subscriber name data, (ii) at least one secondary key field storing secondary data, and (iii) a target information field storing telephone number data. A speech recognition engine is connected for receiving a speech input from a caller and, in response, provides requested party data. A search engine responds to the requested party data for accessing the data base to identify selected ones of the records. The system further includes a processor for identifying respective secondary data of the selected ones of the records, the secondary data distinguishing one or more of the selected ones of the records from the others. An output device is connected to provide a prompt including the secondary data for soliciting an input designating one or more of the selected ones of the records.

According to another aspect of the invention, a method of retrieving data includes the steps of storing a plurality of records, each of the records including a primary key field storing first identification data, at least one secondary key field storing secondary data, and a target information field storing requested data, and receiving input identification data. The identification data is compared with the first identification data and so as to identify selected ones of the records. Respective secondary data of the selected records are used to distinguish one or more of the selected records from the others. A prompt, including the secondary data, is then provided for soliciting an input designating one or more of the selected ones of the records.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims, with reference being had to the accompanying drawings forming a part thereof, wherein like numerals refer to like elements throughout.

BRIEF DESCRIPTION OF THE DRAWINGS

FIG. 2 is a block diagram of a voice activated dialer function provided by an intelligent peripheral of a public switched telephone network.

FIG. 3 is a block diagram of an autoattendant function provided as part of a private automatic branch exchange (PBX).

DETAILED DESCRIPTION OF THE PREFERRED EMBODIMENT

Figure 1:
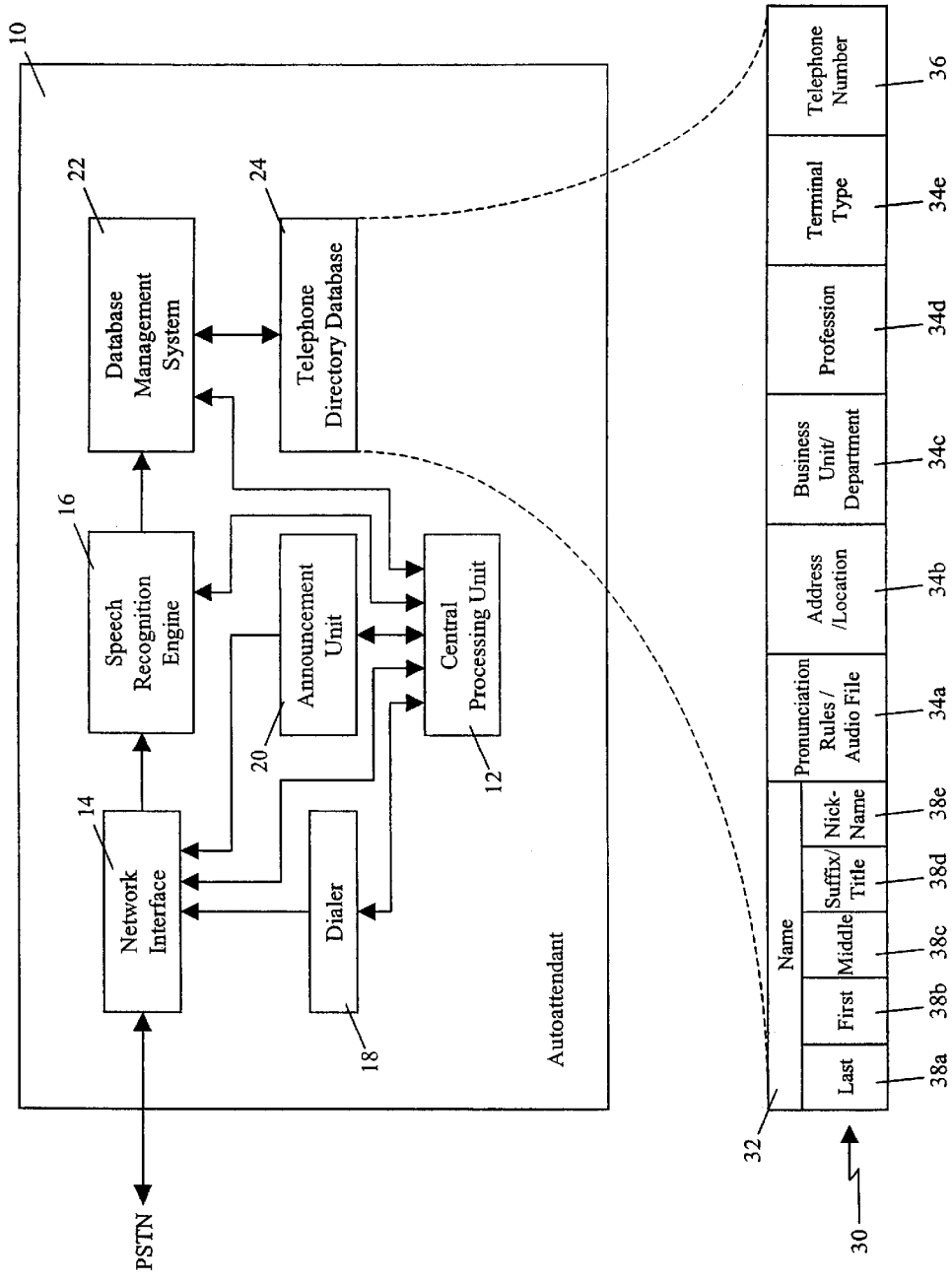
FIG. 1 is a block diagram of an interactive, voice responsive autoattendant for answering and forwarding incoming telephone calls.

FIG. 1 is a block diagram of an autoattendant system for answering and forwarding incoming telephone calls based on a spoken listing request and further showing the organization of a record contained in a database stored by the system. Autoattendant system 10 includes central processing unit (CPU) 12 programmed to coordinate and control system operations according to a program stored in memory (not shown). CPU 12 controls network interface 14, speech recognition engine 16, dialer 18, announcement unit 20 and database management system 22. Although individual lines are shown for transmission of control and information signals between the elements of autoattendant 10, typically control and data will be supported by one or more system address and data buses. Network interface 14 is connected to the public switched telephone network (PSTN) for answering incoming telephone calls from the PSTN. This interface may be in the form of single or multiple POTS or ISDN lines or may be a trunk group such as a PBX trunk with associated signaling. Network interface 14 provides an audio output to speech recognition engine 16 which includes a speaker independent recognition capability to convert speech signals in the form of audio to a digital data stream. This digital data stream may be in the form of ASCII text and, preferably, includes the phonetic equivalent of the spoken speech. For example, English language speech may be represented by a set of 39 phonemes, for which the vowels may carry lexical stress, 0 meaning no stress, 1 primary stress, and 2 secondary stress. These phonemes are shown in the following table including examples:

| Phoneme | Example | Translation |
| --- | --- | --- |
| AA | odd | AA D |
| AE | at | AE T |
| AH | hut | HH AH T |
| AO | ought | AO T |
| AW | cow | K AW |
| AY | hide | HH AY D |
| B | be | B IY |
| CH | cheese | CH IY Z |
| D | dee | D IY |
| DH | thee | DH IY |
| EH | Ed | EH D |
| ER | hurt | HH ER T |
| EY | ate | EY T |
| F | fee | F IY |
| G | green | G R IY N |
| HH | he | HH IY |
| IH | it | IH T |
| IY | eat | IY T |
| JH | gee | JH IY |
| K | key | K IY |
| L | lee | L IY |
| M | me | M IY |
| N | knee | N IY |
| NG | ping | P IH NG |
| OW | oat | OW T |
| OY | toy | T OY |
| P | pee | P IY |
| R | read | R IY D |
| S | sea | S IY |
| SH | she | SH IY |
| T | tea | T IY |
| TH | theta | TH EY T AH |
| UH | hood | HH UH D |
| UW | two | T UW |
| V | vee | V IY |
| W | we | W IY |
| Y | yield | Y IY L D |
| Z | zee | Z IY |
| ZH | seizure | S IY ZH ER |

The digital phoneme string from speech recognition engine 16 is provided to database management system 22 which, in turn, is connected to telephone directory database 24. The structure of database 24 is shown in the lower portion of FIG. 1, comprising a plurality of records 30. Each record 30 includes name information, some of which, depending on the specific input provided by the caller, would constitute first identification or primary key information, typically the last and probably first names 38a, 38b, of the party being called. To the extent the caller does not give certain name information, it might be considered secondary information to be used in later disambiguation processing to distinguish between listings, as necessary. Further, some of the name information may be alternate primary key information, i.e., nickname 38e. Thus, middle name 38c and suffix or title information 38d may be either primary or secondary information depending on its use.

In addition to the name field 32, secondary fields store other information about the listing which may be available to distinguish between and among others of the listings. The secondary information includes fields containing pronunciation rules for speaking the name of the listed party such as the phonetic equivalent for the name as spelled, or, alternatively, the pronunciation preferred by the particular listing as designated by the listing party and at his or her request. Alternatively, field 34a may include an audio file which may be played by appropriate software, e.g., a WAV or MP3 format file. Other information which may be used as secondary keys in distinguishing between and among the listings include address/location data field 34b, business unit/department field 34c, professional information field 34d, and terminal type 34e. While the information contained in the secondary fields would usually be used to distinguish between or among different parties having the same or similar names, the information contained in the terminal type field 34e would commonly be used to distinguish between multiple listings to the same party to accommodate multiple functions. Thus, a party might have several lines, one for incoming voice calls, another for faxes, and still another for cellular telephone calls. In use, however, this secondary information would be used in a similar manner to the other secondary information. Finally, each of the records includes a telephone number field 36 which is the target information being requested. Of course, although telephone number information is shown, any target information might be included or referenced, such as Internet address, e-mail, medical information, or any other information typically stored in a database or accessible by a directory type listing.

In response to a request from CPU 12, database management system 22 searches telephone directory database 24 and identifies an initial candidate listing of records satisfying the primary search criteria, i.e., the name information provided by speech recognition engine 16. The results of the search are then used to select an appropriate announcement to be played to the caller by announcement unit 20 through network interface 14. For example, if the initial name information provided by the caller resulted in identification of a single entry, the autoattendant 10 would announce to the caller that the call was being forwarded to the named party. The network interface would then provide appropriate signaling to the PSTN to transfer the call to the appropriate telephone number for the named party. For example, using a 3-way calling switch feature, network interface 14 would provide a flash-hook signal to the PSTN by momentarily going "on hook" so that, in response, the corresponding PSTN switch would place the calling party on hold and provide autoattendant 10 with a second dial tone. Upon detecting a second dial tone, network interface 14 would notify CPU 12, which, in response, would cause dialer 18 to outdial the telephone number corresponding to the party being called, initiate a second "flash-hook" signal to bridge the calls, and, subsequently, go back on hook to drop out of the bridge so that the calling party would be connected directly to the requested listing.

Alternatively, as will be explained in further detail below, if data management system 22 is unable to uniquely identify a listing corresponding to the named party, central processing unit 12 in combination with announcement unit 20 would provide a series of prompts soliciting additional information from the calling party in an attempt to resolve the ambiguity, i.e., disambiguate the listings.

Referring to FIG. 2, autoattendant 10 may be embodied as an intelligent peripheral (IP) within a telephone network. As shown, multiple parties 40a, 40b, and 40c are connected to an originating telephone switch 42 which, in turn, is connected to voice network 46. Voice network 46, in turn, connects to destination telephone switch 48 and parties 52a, 54b and 52c as listed in telephone directory database 24. In addition to the components of the voice network, each switch is interfaced to a switching control network, typically in the form of SS7, for providing signaling between and among switches including signal switching points (SSP) 44 and 50 connected to a service transfer point (STP) 54. STP 54 may be connected directly to IP 58 and/or to an integrated signaling control point (ISCP) 56 providing additional processing and database facilities.

In the network configuration shown in FIG. 2, the autoattendant functionality may be initiated either by and at origination telephone switch 42 in response to a dialed number trigger, or at destination telephone switch 48 in response to a termination trigger. For example, call originating terminal 40a may dial a telephone number, such as "411" initiating a dialed number trigger at originating telephone switch 42 causing call processing to be suspended by the switch and an appropriate message sent by SSP 44 to STP 54. STP 54, alone or via ISCP 56, would cause IP 58 to initiate processing and provide services to telephone switch 42, either directly or via an intermediary switch of voice network 46, including prompts generated by the autoattendant function. Upon identification of an appropriate telephone number, IP 58 would then communicate the telephone number to STP 54 for transmission to SSP 44 and telephone switch 42 whereupon the call would be completed through voice network 46 to telephone switch 48 and the appropriate called party 52a, 52b or 52c. Although herein referenced as an autoattendant function, this functionality when incorporated into a network, particularly using a dedicated, abbreviated 3-digit number such as "411," would typically be provided as a universal directory assistance service, available network-wide.

An alternative embodiment is shown in FIG. 3, wherein autoattendant 10 is incorporated as customer premises equipment (CPE) as part of or augmenting a local private automatic branch exchange (PBX) 60. In this configuration, listed parties 62a–62b and 62c are serviced by autoattendant 10 for connecting incoming calls. In this on-site configuration, calls to a main telephone number are extended to and answered by PBX 60 using autoattendant 10 to provide an appropriate greeting. The calling party or caller is. greeted and prompted to speak the name of the desired person or department so that the call can be completed to that person. Upon identification of the appropriate telephone number or extension, PBX 60 forwards or extends the call to the appropriate party.

Figure 4:
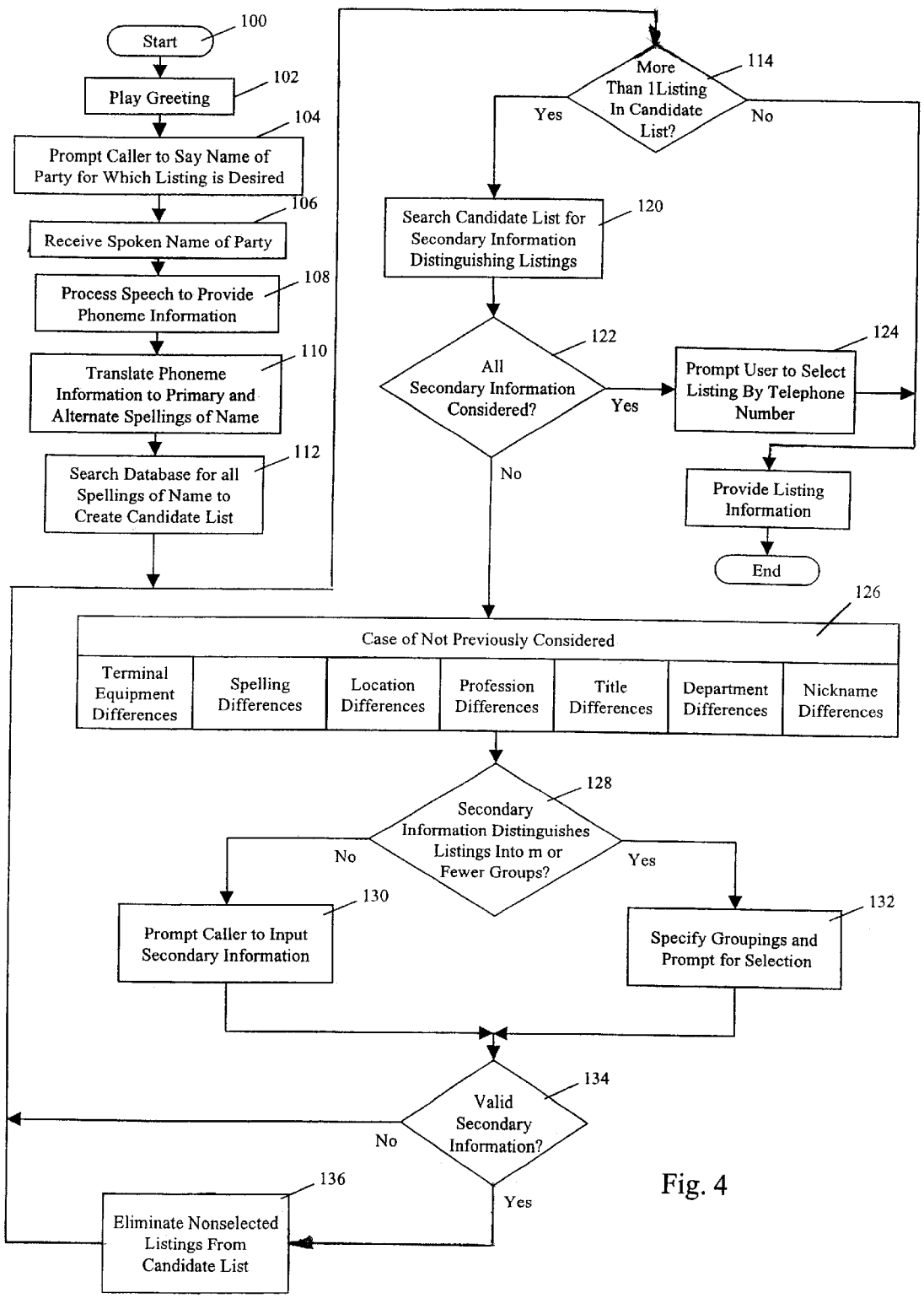
FIG. 4 is a logic flow diagram of an interactive directory search method which intelligently uses secondary search criteria to resolve ambiguities resulting from duplicate primary keys.

FIG. 4 shows the logic flow of the interactive directory search method according to an embodiment of the invention including intelligent secondary search facilities used to resolve ambiguities resulting from duplicate primary keys. Entering the method at step 100, an initial greeting is played at step 102. The initial greeting may include a variety of options available to the caller and/or may include a general greeting such as identification of the associated business or facility name. At step 104, the caller is prompted to say the name of the party being called, the speech signal being received at step 106 and processed at step 108 to extract phoneme information. The phoneme information may then be used to identify spellings of names to be searched for and, as will be described later, to identify specific listings having exceptional pronunciations. The phoneme information may also be used by the system in prompt generation so that the system uses the same name pronunciation as that used by the caller to "parrot back" the requested name.

The database is searched at step 112 to identify all spellings of names and listings corresponding to exceptional pronunciations of names so as to create a candidate list. Processing then continues at step 114 to determine if more than one listing is contained in the candidate list. Step 114 is also the top of a "do while" loop which repeatedly attempts to resolve ambiguities due to multiple listings by using secondary information about each of the listings to disambiguate the search process. Thus, if the candidate list includes a single record, processing continues out the right side of step 114 to provide listing information and any other appropriate processing, e.g., initiate dialing of the corresponding telephone number. Alternatively, if the candidate list includes two or more listings, then processing continues out the left side of step 114 to step 120 where secondary information is searched in an attempt to distinguish the listings from and among each other.

At step 122, the relevant secondary information is examined to see if it has already been considered in a previous iteration. Thus, if there are still multiple listings in the candidate list and all secondary information useful in distinguishing listings from and among each other have been considered, then processing continues at step 124 where the user is prompted to select a listing by telephone number. If, however, there exists secondary information which has not been considered, processing continues at step 126 which sequentially considers information contained in the secondary information fields. Alternatively, step 126 may prioritize consideration of particularly relevant secondary fields more likely to result in disambiguation of listings or include information more likely to be known by the average caller, e.g., the location or department of a particular party. Another method of categorizing and prioritizing secondary key information will be described below.

Upon identification of a secondary field, processing continues at step 128 where a determination of how many groupings are created by the secondary information is made. This check is performed to avoid enumerating a large number of secondary information categories to a caller when the caller (1) may be able to quickly provide the appropriate secondary information to be matched, or (2) may not know the secondary information to be solicited. For example, if "m" equals 3, then groupings of four or more would result in processing continuing at step 130 where the caller would be prompted to input the appropriate secondary information, e.g, "We have seventeen listings for a Mr. John Smith at fourteen locations, do you know the location of the Mr. Smith you are looking for?" Alternatively, if a small number of groupings result from the secondary information under consideration, processing continues at step 132 where the caller is prompted to select from among the categories, e.g., "We have listings for a Jane Jones in three of our facilities. Do you want the Jane Jones in Arlington, Silver Spring, or Washington, D.C.?" [pause] "If you like, press or say 1 for Arlington, 2 for Silver Spring, or 3 for Washington, D.C." Note that in this latter processing, the caller is given the options of saying the name of the desired location, entering the information by DTMF, or saying the number corresponding to the category.

Using either prompting step 130 or 132, the input is checked at step 134 to determine if valid secondary information has been received. For example, the caller may have been unable to identify the location of the called party so that processing continues back at the top of the while loop represented by step 114. Alternatively, if a valid secondary information input has been received, processing continues at step 136 where listings of the non-selected categories are eliminated from the candidate list and processing will then continue at decision step 114. Upon looping back to step 114, the method determines if there are still multiple entries in the candidate list or if the conflict has been resolved. If multiple entries still exist, the process will loop through, considering other secondary information not previously looked at in an attempt to resolve the ambiguity.

Figure 5:
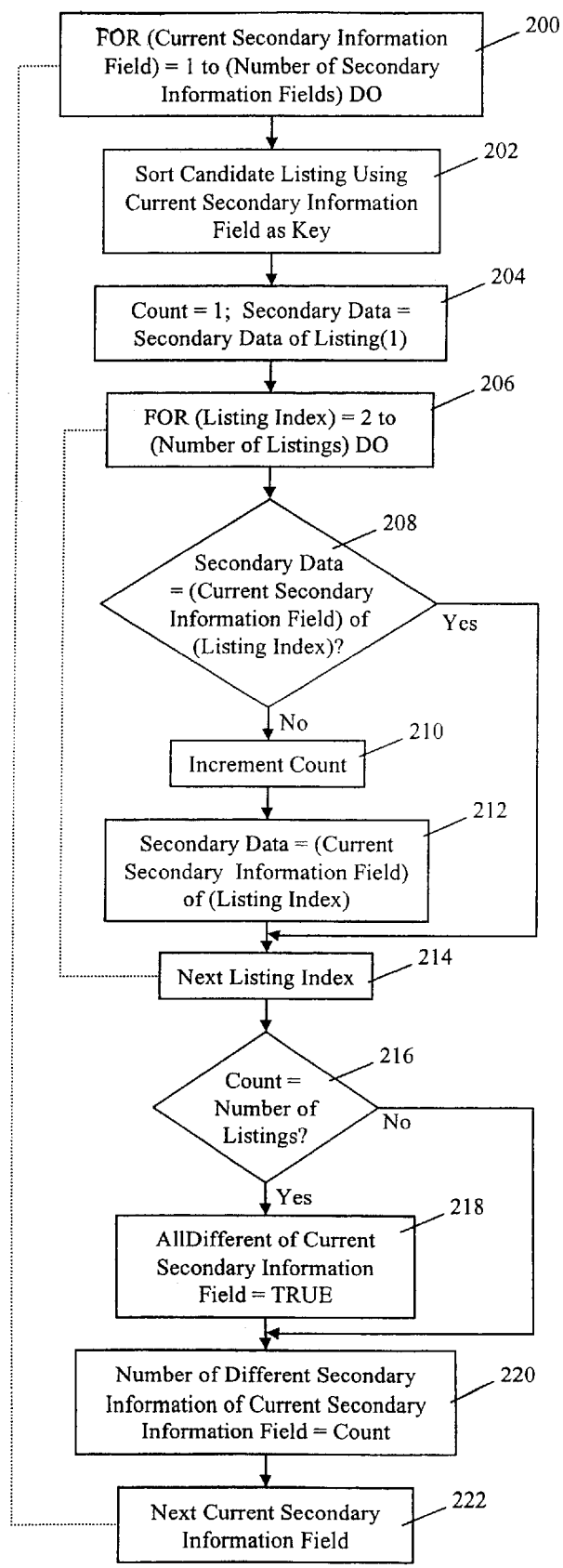
FIG. 5 is a logic flow diagram of a method of categorizing and prioritizing secondary key information for use in disambiguation of directory search results.

A method of identifying usable secondary information fields, providing prioritization information for use of the fields, and identifying a number of categories into which each of the secondary information fields divides the listings, is implemented by the steps of FIG. 5. Initially, at step 200, the processing begins at the top of an outer "FOR" loop which sequentially examines each of the secondary information fields for distinguishing information. Preferably, step 200 considers only those secondary information fields not previously used during the processing described in connection with FIG. 4. At step 202, the candidate listing is sorted based on the indexed secondary information field. At step 204, a variable "count" is set equal to 1 and a variable "secondary data" is set equal to the secondary data contained in the first listing of the sorted list. Processing continues at step 206, the top of an inner "FOR" loop indexing to the second entry of the list to sequentially examine the secondary data contained therein. At decision step 208, the secondary data of the two listings are examined to see if they match or if they are different. If there is no match, i.e., the secondary information is useful in distinguishing between the two listings, the variable "count" is incremented at step 210 and then variable "secondary data" is set equal to the secondary data of the listing under consideration. At step 214, the "listing index" is incremented to point to the next listing and processing loops back to the top step 206.

Upon completion of the inner "FOR" loop and examination of all current candidate listings based on the current secondary information field, the variable "count" is examined to see if it is equal to the number of listings. If it is, i.e., all listings have unique secondary information, then a boolean flag indicating such is set equal to TRUE at step 218. Otherwise, the flag would either default to FALSE, or be set to FALSE upon exiting under the "NO" condition of decision box 216. The number of categories are then stored at step 220 for later reference and, at step 222, the next secondary information field is indexed for consideration and processing back at step 200.

Figure 6:
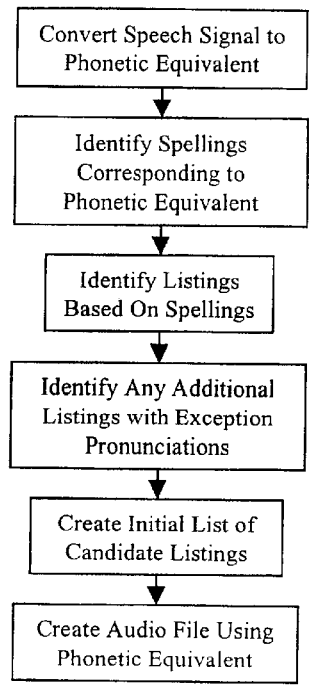
FIG. 6 is a logic flow diagram of a method of identifying candidate listings from a spoken name and using the spoken name to provide prompts mimicking the pronunciation used by the caller.
Figure 7:
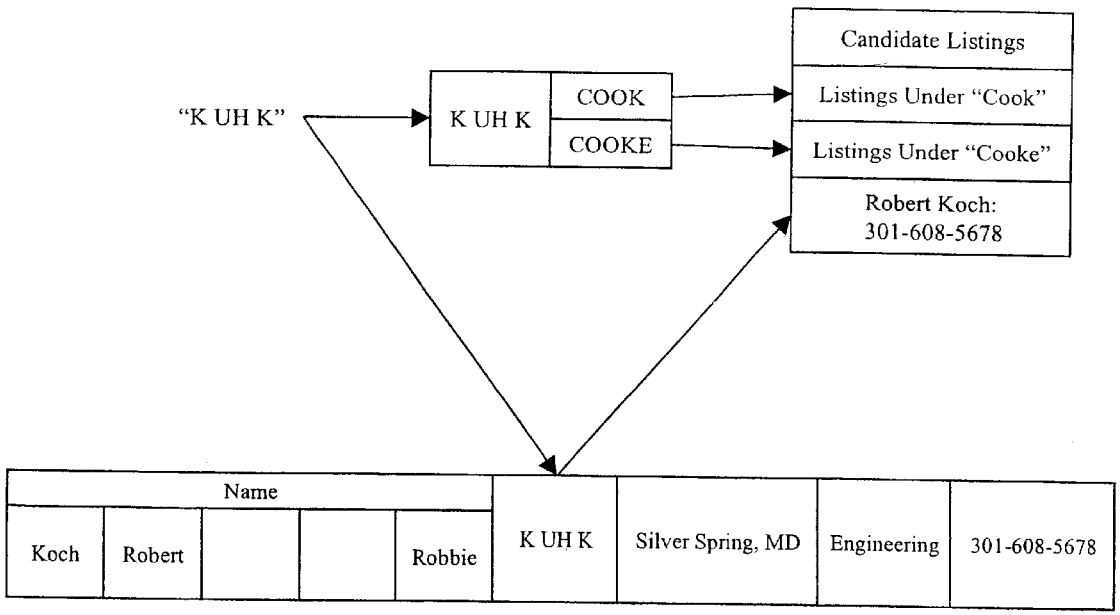
FIG. 7 is a diagram showing normal and exception processing for identification of listings corresponding to a spoken name.

A method of identifying an initial list of candidate listings and tailoring prompts to a caller is shown in FIGS. 6 and 7 of the drawings. With particular reference to FIG. 6, an input speech signal is converted to its phonetic equivalent which is then associated with common spellings for that name. Listings containing those spellings are then identified. In addition, listings having exceptional pronunciations of names are identified and added to the previously identified spelling-based listings to create an initial list of candidate listings. In addition, an audio file is created using the phonetic equivalent so as to mimic back to the caller his or her particular pronunciation of the requested name.

An example of creation of a list of candidate listings is shown in connection with FIG. 7 in response to the spoken name "C-O-O-K." Phonetically, the name "C-O-O-K" is represented as "K UH K" as shown in the upper lefthand portion of FIG. 7. Using a table lookup, the sequence of phonemes would correspond to the name spelled "C-O-O-K" and "C-O-O-K-E." Thus, the spellings would be added to the candidate listings. In addition, listings in which the listed party is known to or has requested a particular pronunciation corresponding to the pronunciation spoken by the caller, is identified. In the example of FIG. 7, a Mr. "Robert K-O-C-H" pronounces his name as if spelled "C-O-O-K" as specified in the corresponding listing, as shown. Thus, the listing for "Robert K-O-C-H" has also been included in the candidate listing. The candidate listing is then used to initiate processing corresponding to step 112 of FIG. 4.

Although unused secondary instruction is sequentially considered in and by the method shown and described with reference to FIG. 5, various criteria may be used to select which category of information will be used as a basis of requesting further information from a caller. For candidate lists having a small number of listings to be resolved and unique secondary information distinguishing the listings, it may be best to solicit the distinguishing information directly. However, where the candidate list is large, it may be more efficient to first request information eliminating a large portion of the listing prior to prompting for distinguishing information. For example, if the candidate list contains more than ten names, it may be more efficient to prompt the caller to provide information not distinguishing individual entries from each other but instead grouping the entries so that a large number may be eliminated from consideration, leaving a manageable list of candidate listings remaining.

The selection of secondary information may also take into consideration the probable availability of such information. For example, if not otherwise supplied, a default first prompt may be to solicit the first name of the called party if not initially supplied.

The system may also take into consideration and use secondary information contained in the initial listing request, such as nicknames used in specifying the desired party, particularly where the nickname is not common to the first names under consideration. For example, while the nickname "Bob" may be commonly used to refer to people names "Robert" and therefore not particularly useful in distinguishing listings, the nickname "Bub" is less common and might result in a search for that nickname in the corresponding field.

Although the embodiment described is in the context of a telephone directory lookup system as implemented by either a call origination or answering system, the invention is applicable to other database search methods, systems and engines to resolve ambiguities between and among entries after an initial primary key search has resulted in the identification of multiple records. For example, in an Internet search situation, wherein a party requests the web site of a particular business name, a search engine may initiate a series of questions to the user requesting further information so as to further limit and, hopefully, identify a specific web address.

While the foregoing has described what are considered to be preferred embodiments of the invention, it is understood that various modifications may be made therein and that the invention may be implemented in various forms and embodiments, and that it may be applied in numerous applications, only some of which have been described herein. It is intended by the following claims to claim all such modifications and variations which fall within the true scope of the invention.

What is claimed is:

1. An information retrieval system comprising:
    a data base including a plurality of records, each of said records including a primary key field storing first identification data, a plurality of selectable secondary key fields storing respective secondary data, and a target information field storing requested data;
    an input processor receiving input identification data;
    a search engine responsive to said input identification data for accessing said data base, comparing said input identification data with said first identification data and, in response, identifying selected ones of said records;
    a processor identifying one of said secondary key fields corresponding to said selected ones of said records which respective secondary data stored in said identified secondary key fields distinguishes one or more of said selected ones of said records from the others; and
    an output device connected to provide a prompt including said secondary data for soliciting an input designating one or more of said selected ones of said records.

2. The information retrieval system according to claim 1 wherein said database comprises an ordered directory of subscriber names and respective telephone numbers.

3. The information retrieval system according to claim 1 wherein said first identification data includes subscriber name information, said secondary data includes location information, and said requested data includes terminal address information.

4. The information retrieval system according to claim 1 further comprising a speech recognition engine receiving a speech signal and, in response, providing said input identification data.

5. The information retrieval system according to claim 4 further comprising an interface for providing said speech signal from a voice telephone network.

6. The information retrieval system according to claim 1 wherein said output device include speech playback means for providing a spoken request for soliciting said input designating said one or more of said selected ones of said records.

7. The information retrieval system according to claim 6 wherein said speech playback means includes a voice recorder receiving a speech signal corresponding to said input identification data.

8. The information retrieval system according to claim 1 wherein said output device includes a speech synthesizer for providing a spoken request for soliciting said input designating said one or more of said selected ones of said records.

9. The information retrieval system according to claim 8 wherein each of said records includes audio data and said speech synthesizer is responsive to said audio data for providing said spoken request.

10. The information retrieval system according to claim 1 wherein said secondary data comprises a plurality of information types.

11. The information retrieval system according to claim 10 wherein said plurality of information types are included in the set consisting of location, department, terminal equipment, alternative names, occupation and specialization information.

12. The information retrieval system according to claim 1 further comprising a telephone dialer for connecting a call in response to a receipt of said input designating one or more of said selected ones of said records.

13. The information retrieval system according to claim 1 wherein each of said records includes audio data and said information retrieval system further comprises a speech synthesizer responsive to said audio data for providing a speech signal corresponding to a designated one of said selected one of said records.

14. The information retrieval system according to claim 13 wherein said audio data is formatted as a WAV file.

15. The information retrieval system according to claim 13 wherein said audio data comprises pronunciation rules for generating speech representing information stored as a part of a corresponding one of said records.

16. The information retrieval system according to claim 1 further comprising a pronunciation table of ordered name pronunciation data.

17. The information retrieval system according to claim 16 further comprising a speech generator responsive to said name pronunciation data for generating a speech signal.

18. The information retrieval system according to claim 1 said processor is operative in an interactive conversational mode for generating a series of prompts eliciting called party identification information from a caller based on distinguishing characteristics of an initially identified subset of potential called parties.

19. A telephone directory system comprising:
a directory of subscriber records, each of said subscriber records including a primary key field storing subscriber name data, a plurality of secondary key fields storing respective secondary data, and a target information field storing telephone number data;
a speech recognition engine connected for receiving a speech input from a caller and, in response, providing requested party data;
a search engine responsive to said requested party data for accessing said data base for identifying selected ones of said records;
a processor identifying one of said secondary key fields corresponding to said selected ones of said records which respective secondary data stored in said identified secondary key fields distinguishes one or more of said selected ones of said records from the others; and
an output device connected to provide a prompt including said secondary data for soliciting an input designating one or more of said selected ones of said records.

20. The telephone directory system according to claim 19 wherein secondary data includes information selected from the set comprising location, department, terminal equipment, alternative names, occupation and specialization information.

21. The telephone directory system according to claim 19 wherein said output device includes a speech synthesizer for providing a spoken request for soliciting said input designating said one or more of said selected ones of said records.

22. The telephone directory system according to claim 21 wherein each of said subscriber records includes audio data and said speech synthesizer is responsive to said audio data for providing said spoken request.

23. The telephone directory system according to claim 19 further comprising a telephone dialer for connecting a call in response to a receipt of said input designating one or more of said selected ones of said records.

24. The information retrieval system according to claim 19 wherein each of said subscriber records includes audio data and said information retrieval system further comprises a speech synthesizer responsive to said audio data for providing a speech signal corresponding to a designated one of said selected one of said records.

25. The telephone directory system according to claim 24 wherein said audio data is formatted as a WAV file.

26. The telephone directory system according to claim 24 wherein said audio data comprises pronunciation rules for generating speech representing information stored as a part of a corresponding one of said records.

27. The telephone directory system according to claim 19 further comprising a pronunciation table of ordered name pronunciation data.

28. The telephone directory system according to claim 27 further comprising a speech generator responsive to said name pronunciation data for generating a speech signal.

29. The telephone directory system according to claim 19 wherein said processor is operative in an interactive conversational mode for generating a series of prompts eliciting called party identification information from a caller based on distinguishing characteristics of an initially identified subset of potential called parties.

30. A method of retrieving data including the steps of:
storing a plurality of records, each of said records including a primary key field storing first identification data, a plurality of secondary key fields storing respective secondary data, and a target information field storing requested data;

secondary receiving input identification data;

comparing said input identification data with said first identification data and, in response, identifying selected ones of said records;

identifying one of said secondary key fields corresponding to said selected ones of said records which respective secondary data stored in said identified secondary key fields distinguishes one or more of said selected ones of said records from the others; and providing a prompt including said secondary data for soliciting an input designating one or more of said selected ones of said records.

31. The method according to claim 30 wherein said step of providing a prompt includes a step of synthesizing a spoken request for soliciting said input designating said one or more of said selected ones of said records.

32. The method according to claim 30 wherein each of said records includes audio data and said speech synthesizer is responsive to said audio data for providing said spoken request.

33. The method according to claim 30 including a step of storing a plurality of information types in respective ones of said secondary key fields of one of said records.

34. The method according to claim 33 wherein said plurality of information types are included in the set consisting of location, department, terminal equipment, alternative names, occupation and specialization information.

35. The method according to claim 30 further comprising a step of connecting a call in response to a receipt of said input designating one or more of said selected ones of said records.

* * * * *